US011501327B2

(12) United States Patent
Liu et al.

(10) Patent No.: US 11,501,327 B2
(45) Date of Patent: Nov. 15, 2022

(54) METHOD, APPARATUS, AND SYSTEM FOR DELIVERING PROMOTION INFORMATION, AND STORAGE MEDIUM

(71) Applicant: TENCENT TECHNOLOGY (SHENZHEN) COMPANY LIMITED, Shenzhen (CN)

(72) Inventors: Dapeng Liu, Shenzhen (CN); Xiaoqing Cao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 86 days.

(21) Appl. No.: 16/197,067

(22) Filed: Nov. 20, 2018

(65) Prior Publication Data
US 2019/0087846 A1 Mar. 21, 2019

Related U.S. Application Data

(63) Continuation of application No. PCT/CN2017/084861, filed on May 18, 2017.

(30) Foreign Application Priority Data

May 25, 2016 (CN) .......................... 201610352701.0

(51) Int. Cl.
*G06Q 30/02* (2012.01)

(52) U.S. Cl.
CPC ......... *G06Q 30/0224* (2013.01); *G06Q 30/02* (2013.01); *G06Q 30/0201* (2013.01); *G06Q 30/0239* (2013.01); *G06Q 30/0251* (2013.01)

(58) Field of Classification Search
CPC ........... G06Q 30/0241; G06Q 30/0242; G06Q 30/0244; G06Q 30/0254; G06Q 30/0269; G06Q 30/0211

See application file for complete search history.

(56) References Cited

U.S. PATENT DOCUMENTS 9,235,865 B1* 1/2016 Zang ................... G06F 16/9535
9,846,916 B2* 12/2017 Juan ....................... G06Q 50/01
(Continued)

FOREIGN PATENT DOCUMENTS

| CN | 102592235 A | 7/2012 |
| CN | 103514215 A | 1/2014 |

(Continued)

OTHER PUBLICATIONS

XuJuan Zhou et al., The state-of-the-art in personalized recommender systems for social networking, May 12, 2011, Artificial Intelligence Review, vol. 37 No. 2, pp. 119-132 (Year: 2011).*

(Continued)

*Primary Examiner* — John Van Bramer
(74) *Attorney, Agent, or Firm* — Anova Law Group, PLLC

(57) ABSTRACT

The present disclosure discloses a method for delivering promotion information. A delivery server obtains a set of promotion-information-items-to-be-delivered for a user, obtains a delivery-recommendation-degree corresponding to the user according to each of promotion-information-items-to-be-delivered in the set of promotion-information-items-to-be-delivered, determines, according to the delivery-recommendation-degree, one or more target promotion-information-items from the set of promotion-information-items-to-be-delivered; and delivers the target promotion-information-items to a user equipment corresponding to the user.

10 Claims, 5 Drawing Sheets

(56) References Cited

U.S. PATENT DOCUMENTS

| | | | | |
|---|---|---|---|---|
| 2005/0114206 A1* | 5/2005 | Bennett | G06Q 30/02 | 705/26.1 |
| 2005/0278443 A1* | 12/2005 | Winner | G06Q 30/02 | 709/224 |
| 2006/0242663 A1* | 10/2006 | Gogerty | G06Q 30/02 | 715/752 |
| 2008/0103907 A1* | 5/2008 | Maislos | G06Q 30/0269 | 705/14.54 |
| 2008/0177635 A1* | 7/2008 | Handel | G06Q 30/0601 | 705/26.1 |
| 2008/0281687 A1* | 11/2008 | Hurwitz | G06Q 30/0255 | 705/14.1 |
| 2009/0217178 A1* | 8/2009 | Niyogi | G06Q 30/0255 | 707/999.1 |
| 2010/0076850 A1* | 3/2010 | Parekh | G06Q 30/02 | 705/14.66 |
| 2012/0166285 A1* | 6/2012 | Shapiro | G06Q 30/0261 | 705/14.66 |
| 2012/0226748 A1* | 9/2012 | Bosworth | G06Q 10/103 | 709/204 |
| 2013/0254283 A1* | 9/2013 | Garcia-Martinez | G06Q 30/0242 | 709/204 |
| 2013/0275212 A1* | 10/2013 | Agarwal | G06Q 30/0254 | 705/14.52 |
| 2014/0006195 A1* | 1/2014 | Wilson | G06Q 20/20 | 705/21 |
| 2014/0081720 A1* | 3/2014 | Wu | G06Q 30/00 | 705/14.1 |
| 2014/0149418 A1* | 5/2014 | Qin | H04L 67/535 | 707/740 |
| 2014/0324571 A1* | 10/2014 | Zhou | G06Q 30/0277 | 705/14.45 |
| 2014/0358668 A1* | 12/2014 | Fredinburg | G06Q 30/02 | 705/14.66 |
| 2016/0055164 A1* | 2/2016 | Cantarero | G06F 16/447 | 707/740 |
| 2016/0364492 A1* | 12/2016 | Thomas | G06Q 50/01 | |
| 2017/0277691 A1* | 9/2017 | Agarwal | H04L 67/535 | |

FOREIGN PATENT DOCUMENTS

| | | |
|---|---|---|
| CN | 104063476 A | 9/2014 |
| CN | 104967679 A | 10/2015 |
| CN | 105512916 A | 4/2016 |
| WO | 2008032297 A2 | 3/2008 |

OTHER PUBLICATIONS

The European Patent Office (EPO) The Extended European Search Report for 17802084.8 dated Oct. 15, 2019 9 Pages.

The State Intellectual Property Office of the People's Republic of China (SIPO) Office Action 1 for 201610352701.0 dated Nov. 27, 2019 6 Pages (including translation).

Kujuan Zhou et al: "The state-of-the-art in personalized recommender systems for social networking", Artificial Intelligence Review, vol. 37, No. 2, May 12, 2011 (May 12, 2011), pp. 119-132, XP055628045, ISSN: 0269-2821, DOI:10.1007/s10462-011-9222-1 14 Pages.

The World Intellectual Property Organization (WIPO) International Search Report for PCT/CN2017/084861 dated Aug. 2, 2017 5 Pages (including translation).

* cited by examiner

METHOD, APPARATUS, AND SYSTEM FOR DELIVERING PROMOTION INFORMATION, AND STORAGE MEDIUM

RELATED APPLICATIONS

This application is a continuation application of PCT Patent Application No. PCT/CN2017/084861, filed on May 18, 2017, which claims priority to Chinese Patent Application No. 201610352701.0, entitled "METHOD, APPARATUS, AND SYSTEM FOR DELIVERING PROMOTION INFORMATION" filed with the Patent Office of China on May 25, 2016, which is incorporated herein by reference in its entirety.

FIELD OF TECHNOLOGY

This application relates to the field of communications technologies and, in particular, to a method, an apparatus, and a system for delivering promotion information, and a storage medium.

BACKGROUND

A user may usually receive promotion information pushed by a server in a process of using a social application, for example, an advertisement used for promoting a product or a thing. The promotion information is significant for advertisers and, therefore, how to deliver promotion information has always been a focus of the industry.

Currently, when searching for users to which the advertisement is to be delivered, degrees to which users are interested in the advertisement are usually analyzed first. For example, degrees to which users are interested in an advertisement are determined according to behaviors of the users, tags of the users, or the like, so as to predict rates of clicking on the advertisement by the users. Then, the users are scored based on the rates of clicking, and the advertisement is delivered to users in descending order of scores. Since only the rates of clicking of the users are considered in this advertisement delivering method, the delivery is often inaccurate and the delivery effect is poor. The disclosed methods and systems are directed to solve one or more problems set forth above and other problems.

SUMMARY

An objective of this application lies in providing a method, an apparatus, and a system for delivering promotion information, so as to resolve the technical problems of low accuracy and poor delivery effect of the existing promotion information delivery.

One aspect of the present disclosure includes a method for delivering promotion information. A delivery server obtains a set of promotion-information-items-to-be-delivered for a user, obtains a delivery-recommendation-degree corresponding to the user according to each of promotion-information-items-to-be-delivered in the set of promotion-information-items-to-be-delivered, determines, according to the delivery-recommendation-degree, one or more target promotion-information-items from the set of promotion-information-items-to-be-delivered; and delivers the target promotion-information-items to a user equipment corresponding to the user.

Another aspect of the present disclosure includes an apparatus for delivering promotion information. The apparatus includes a memory storing computer program instructions; and a processor coupled to the memory. When executing the computer program instructions, the processor is configured to perform: obtaining a set of promotion-information-items-to-be-delivered for a user; obtaining a delivery-recommendation-degree corresponding to the user according to each of promotion-information-items-to-be-delivered in the set of promotion-information-items-to-be-delivered; determining, according to the delivery-recommendation-degree, one or more target promotion-information-items from the set of promotion-information-items-to-be-delivered; and delivering the target promotion-information-items to a user equipment corresponding to the user.

Another aspect of the present disclosure includes a non-transitory computer-readable storage medium. The non-transitory computer-readable storage medium stores computer program instructions executable by at least one processor to perform: obtaining a set of promotion-information-items-to-be-delivered for a user; obtaining a delivery-recommendation-degree corresponding to the user according to each of promotion-information-items-to-be-delivered in the set of promotion-information-items-to-be-delivered; determining, according to the delivery-recommendation-degree, one or more target promotion-information-items from the set of promotion-information-items-to-be-delivered; and delivering the target promotion-information-items to a user equipment corresponding to the user.

Other aspects of the present disclosure can be understood by those skilled in the art in light of the description, the claims, and the drawings of the present disclosure.

DETAILED DESCRIPTION

The following describes the technical solutions in the embodiments of the present disclosure with reference to the accompanying drawings. Apparently, the described embodiments are some embodiments of the present disclosure rather than all of the embodiments. Other embodiments obtained by a person skilled in the art based on the embodiments of the present disclosure without creative efforts shall fall within the protection scope of the present disclosure.

The embodiments of the present disclosure provide a method, an apparatus, and a system for delivering promotion information.

Figure 1A:
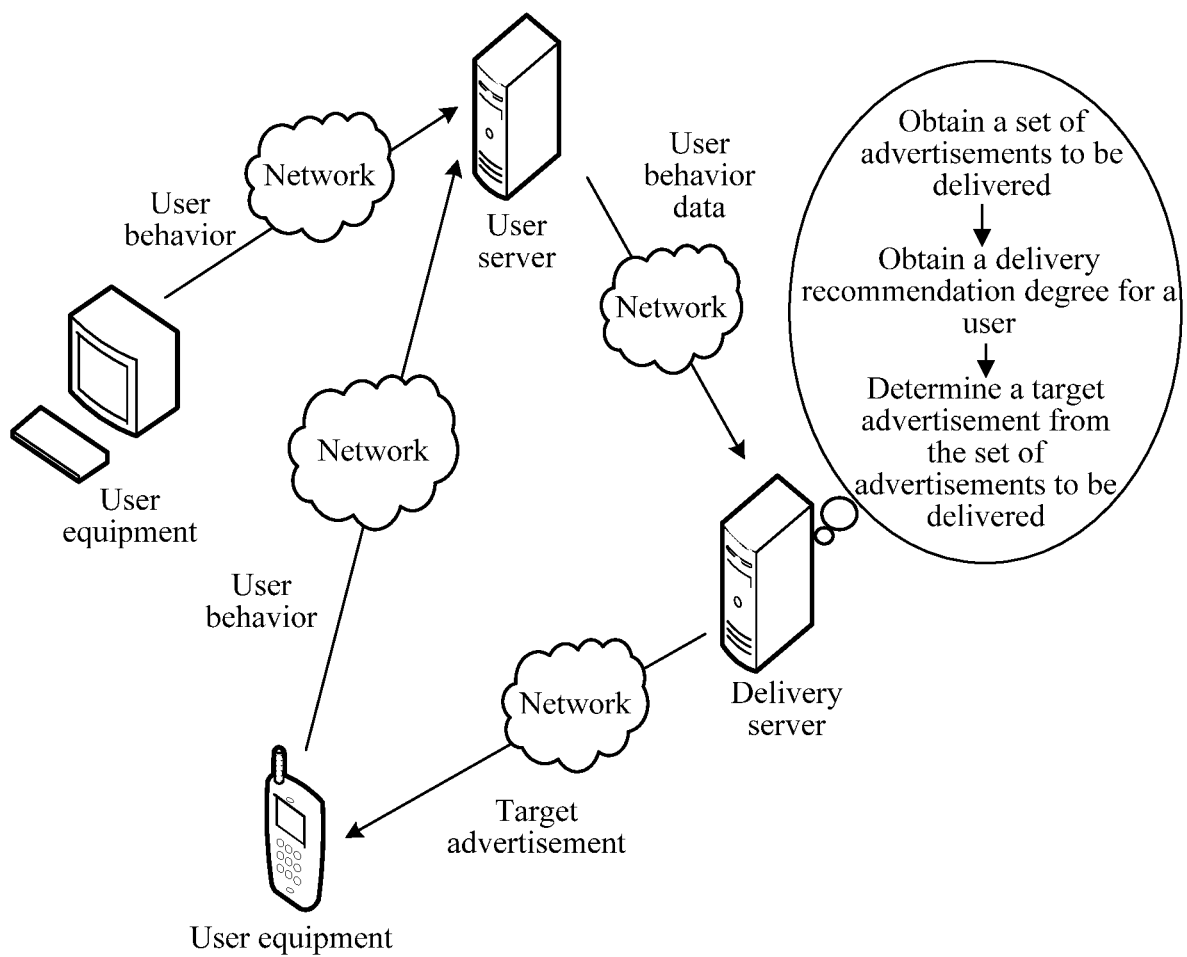
FIG. 1A is a schematic diagram of a system for delivering promotion information according to an embodiment of the present disclosure.

Referring to FIG. 1A, the system for delivering promotion information may include any apparatus for delivering promotion information provided in the embodiments of the present disclosure. The apparatus for delivering promotion information may be specifically integrated in a server (for example, in a delivery server). In addition, the system for delivering promotion information may further include other devices, such as a user equipment and a user server. The user equipment (for example, a smartphone, or a computer) is configured to receive promotion information to be delivered by the delivery server. The user server is configured to collect behavior data of all users for the delivered promotion information. The delivery server is configured to obtain the behavior data of the user from the user server, and calculate, according to the behavior data, a delivery recommendation degree of the user for the promotion information to be delivered.

As shown in FIG. 1A, before delivering an advertisement to a user through a network, it is needed to select an appropriate advertisement for delivering. Therefore, the delivery server may obtain a set of advertisements-to-be-delivered for the user, and obtain a delivery-recommendation-degree of the user for each advertisement-to-be-delivered in the set of advertisements-to-be-delivered. Then, the delivery server determines, according to the delivery-recommendation-degree, a target advertisement from the set of advertisements-to-be-delivered. For example, the delivery server determine an advertisement with a high delivery-recommendation-degree as the target advertisement and sends the target advertisement-to-be-delivered to the user equipment for delivering. Various factors, such as a clicking intention of the user and friend interaction influence, can be comprehensively taken into consideration to select and deliver an advertisement to the user, achieving high delivery accuracy and a good delivery effect.

One embodiment provides descriptions from the perspective of an apparatus for delivering promotion information. The apparatus for delivering promotion information may be integrated in a delivery server.

Figure 1B:
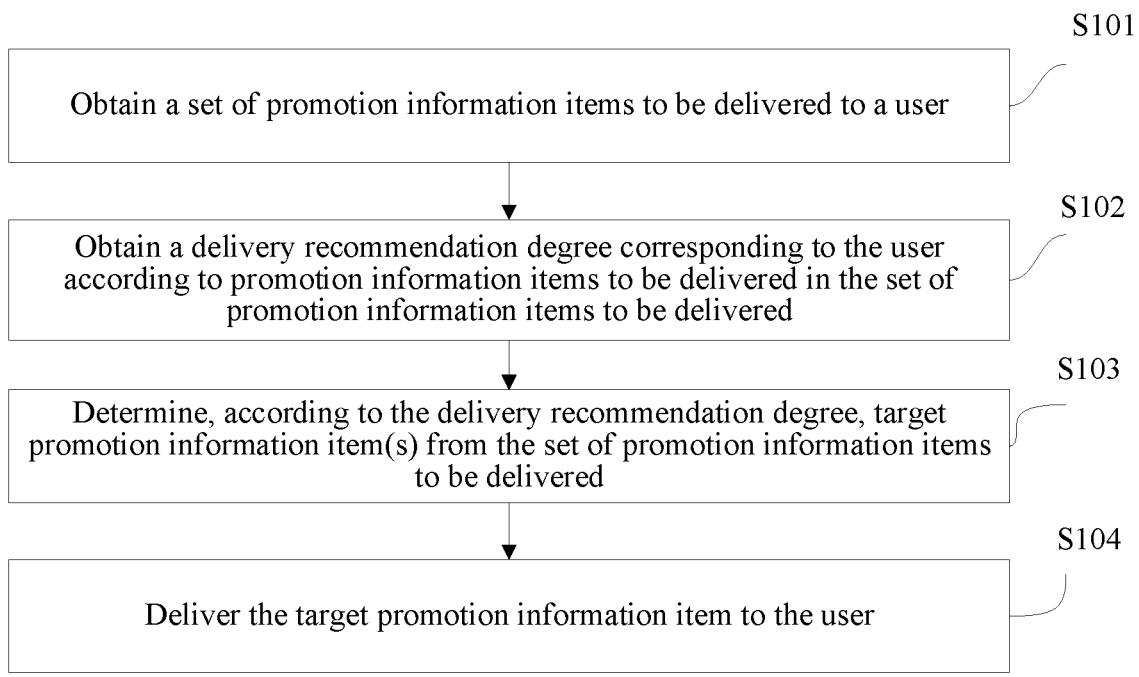
FIG. 1B is a schematic flowchart of a method for delivering promotion information according to an embodiment of the present disclosure.

Referring to FIG. 1B, FIG. 1B specifically describes a method for delivering promotion information according to one embodiment of the present disclosure. The method may include the followings.

S101: Obtaining a set of promotion-information-items-to-be-delivered for a user.

In one embodiment, the set of promotion-information-items-to-be-delivered is usually stored in a delivery server and may include all promotion-information-items which have not been delivered to the user by the delivery server. The promotion-information-item may be an advertisement, or may also be other information to be promoted and delivered. The promotion-information-items are mainly delivered in some social applications, for example, a microblog or clients of some online dating sites. When the delivery server receives a delivering request sent by a user equipment, the delivery server obtains a set of promotion-information-items-to-be-delivered to the user, and generally the set of promotion-information-items-to-be-delivered are a sum of all the promotion-information-items which have not been delivered to the user.

S102: Obtaining a delivery-recommendation-degree corresponding to the user according to individual promotion-information-item-to-be-delivered in the set of promotion-information-items-to-be-delivered.

In one embodiment, the delivery-recommendation-degree mainly refers to a degree of recommendation to deliver the promotion-information-item-to-be-delivered to the user, which may be represented as a score or a ratio.

Accordingly, S102 may specifically include the followings.

(1) Obtaining user behavior data and friend behavior data of the user.

In one embodiment, the friend behavior data may refer to behavior data of all friends of the user. The user behavior data and the friend behavior data may be historical behavior data of the user or the user's friends, which may be stored in the user server and may specifically include behaviors of viewing, commenting, giving a thumb-up, forwarding, replying, or the like for the delivered promotion-information-item by the user or the user's friends, and behaviors of chatting and interacting with others by the user or the user's friends.

In a practical application process, when the user or the user's friend performs behaviors such as viewing, commenting, giving a thumb-up, forwarding, or replying on the delivered promotion-information-item by the user equipment, such as a smartphone, the user equipment may send the behavior data to the user server for storing.

(2) Determining a preset category to which the promotion-information-item-to-be-delivered in the set of promotion-information-items-to-be-delivered belongs.

In one embodiment, the preset category may be determined according to actual requirements. The preset category may be an application field or a related theme of a product in the promotion-information-item, or a promotion purpose of the promotion-information-item. For example, the preset category may be automobiles, mothers and babies, men's clothing, women's clothing, or public welfare, etc. In a practical application, the preset category may be stored in the delivery server in advance, and a series of keywords are set for the preset category, so as to match a corresponding keyword according to literal content of the promotion-information-item-to-be-delivered and obtain the corresponding preset category.

(3) Determining, according to the preset category, the user behavior data, and the friend behavior data, a personal engagement degree, a social influence degree, and a degree of being influenced by a friend of the user for the promotion-information-item-to-be-delivered.

In one embodiment, the personal engagement degree, social influence degree, and degree of being influenced by a friend of the user are considered factors for the delivery server to select appropriate promotion-information-item-to-be-delivered to the user. By considering the factors, the delivery server may deliver promotion-information-item to the user relatively accurately, with a high delivery effect.

Further, step (3) above may specifically include the followings.

(3A) Determining, according to the friend behavior data and the user behavior data, a degree of influence on the user generated by a friend who has interacted with the promotion-information-item-to-be-delivered, so as to obtain the degree of being influenced by a friend.

In one embodiment, the degree of being influenced by a friend may refer to a degree of influence on the user of an interaction operation for the promotion-information-item by the user's friend, and the interaction may refer to an operation of commenting, giving a thumb-up for, or forwarding the promotion-information-item, or the like, but does not include an operation of viewing. Generally, influence is generated on the user only after the user's friend interacts with the promotion-information-item. If the user's friend only viewed or browsed the promotion-information-item, no influence is generated on the user.

Further, step (3A) above may specifically include: determining, according to the friend behavior data, a first friend who has interacted with the promotion-information-item-to-be-delivered, and obtaining friend behavior sub-data of the first friend from the friend behavior data; and counting, according to the user behavior data and the friend behavior sub-data, an intimacy degree between the user and the first friend, and determining the intimacy degree as the degree of being influenced by a friend of the user.

In one embodiment, when the promotion-information-item-to-be-delivered is delivered to the first friend, if the first friend interacts with the delivered promotion-information-item, such as commenting, giving a thumb-up, or forwarding, the user may watch the interaction operation in the process of delivering the promotion-information-item-to-be-delivered to the user. Generally, the interaction operation may influence a subsequent clicking operation on the promotion-information-item-to-be-delivered by the user, such as viewing or interacting, and the degree of influence is closely associated with the intimacy degree between the user and the first friend.

Specifically, the intimacy degree may refer to a degree of contact closeness between the user and the first friend, for example, a chatting frequency, a degree of interest coincidence, and an interaction rate of the two parties. The interaction rate of the two parties may include a frequency of performing an operation such as giving a thumb-up, replying, commenting, or forwarding on content published by the counterpart. The degree of contact closeness may be obtained by analyzing the historical behavior data between the first friend and the user. The historical behavior data may be behavior data of the user or the user's friend within recent one month or half a year. Certainly, the specific period of time may be determined according to actual requirements.

(3B) Predicting, according to the user behavior data and the preset category, a degree of interest of the user in the promotion-information-item-to-be-delivered, to obtain the personal engagement degree.

In one embodiment, the degree of interest or the personal engagement degree may refer to a probability of which the user performs a clicking operation on the promotion-information-item-to-be-delivered without being influenced by others. The degree of interest of the user in the promotion-information-item-to-be-delivered may be predicted by combining a characteristic of the user and a characteristic of the promotion-information-item-to-be-delivered. The characteristic of the user may include information such as a gender, an age, an interest, or a historical active field of the user, and can be obtained by analyzing the historical behavior data of the user. The characteristic of the promotion-information-item-to-be-delivered may refer to the preset category to which the promotion-information-item-to-be-delivered belongs, for example, an application field or a relevant theme of a product in the promotion-information-item-to-be-delivered or a promotion purpose.

Specifically, the characteristic of the user may be determined by analyzing the historical behavior data of the user, and the degree of interest of the user in the promotion-information-item-to-be-delivered may be predicted in combination with the promotion-information-item-to-be-delivered by a logistic regression (LR) algorithm or a deep learning algorithm, so as to obtain the personal engagement degree of the user.

(3C) Predicting, according to the friend behavior data, the user behavior data, and the preset category, a degree of influence generated by the user on society, to obtain the social influence degree.

In one embodiment, the social influence degree may refer to a degree of influence, generated after the user interacts with the promotion-information-item, of the interaction operation on a user's friend and on a friend of the user's friend. That is, the social influence degree includes a degree of influence of the user and a degree of influence of the user's friend after the user influences the friend. Generally, the degree of influence of one same user on a friend of the user varies for promotion-information-items of different preset categories, and meanwhile the degree of influence of the user on different friends of the user also varies for the same promotion-information-item.

Further, step (3C) may specifically include: obtaining behavior data of other friends of the user's friend; obtaining interaction data of interaction between the user and all delivered promotion-information-item of the preset category from the user behavior data, and counting a corresponding interaction rate; counting, according to the interaction data and the friend behavior data, a first clicking rate at which the user's friend clicks on the delivered promotion-information-item after the user interacts with the delivered promotion-information-item; counting, according to the friend behavior data and the behavior data of other friends, a second clicking rate at which the friend of the user's friend clicks on the delivered promotion-information-item after the user's friend interacts with the delivered promotion-information-item; and performing calculation, according to the interaction rate, the first clicking rate, and the second clicking rate based on a preset algorithm, so as to predict the social influence degree at which the user influences the society for the promotion-information-item-to-be-delivered.

In one embodiment, the preset algorithm may be set according to actual requirements, and may be, for example, the product of the interaction rate of the user and the first and second clicking rates of all the friends. The behavior data of other friends may refer to behavior data of all friends of the user. The interaction rate may refer to a probability of which the user interacts with promotion-information-item which belongs to the same preset category with the promotion-information-item-to-be-delivered in a past preset period of time (for example, one month or half a year). The clicking operation mainly includes a behavior such as viewing, commenting, giving a thumb-up, or forwarding.

(4) Calculating, according to the personal engagement degree, the social influence degree, and the degree of being influenced by a friend, a delivery-recommendation-degree of delivering the promotion-information-item-to-be-delivered to the user.

In one embodiment, the delivery-recommendation-degree may be calculated according to the following formula:

$$\text{quality}(u, ad) = pctr(u, ad) + \text{diffusion}(u, ad)$$
$$= pctr(u, ad) + \sum v \in F(u) pactive(u, ad) * inf(u, v) * I(v, ad)$$
$$= pctr(u, ad) + pactive(u, ad) * I(u, ad).$$

where u represents the user, v represents the user's friend, and ad represents the promotion-information-item-to-be-delivered.

The quality(u, ad) is the comprehensive score of the user for the promotion-information-item-to-be-delivered, that is, the delivery-recommendation-degree; and pctr(u, ad) is a clicking rate of the user for the promotion-information-itemto-be-delivered, includes a voluntary clicking behavior of the user and a clicking behavior influenced by others, and may be specifically obtained through calculation based on the degree of being influenced by a friend and the personal engagement degree obtained through calculation in step (3A) and step (3B) by a specific algorithm (for example, addition or multiplication).

The diffusion(u, ad) is the social influence degree of the user for the promotion-information-item-to-be-delivered; pactive(u, ad) is the probability of which the user interacts with the promotion-information-item-to-be-delivered, that is, the interaction rate mentioned in step (3C); inf(u, v) is the probability of which a user's friend clicks on the promotion-information-item-to-be-delivered after the user interacts with the promotion-information-item-to-be-delivered (that is, the degree of influence of the user), that is, the first clicking rate mentioned in step (3C); and I(v, ad) is the probability of which a friend of the user's friend clicks on the promotion-information-item-to-be-delivered after the user's friend interacts with the promotion-information-item-to-be-delivered (that is, the degree of influence of the user's friend), that is, the second clicking rate mentioned in step (3C). According to the PageRank algorithm concept, the user's social influence degree of the promotion-information-item-to-be-delivered (i.e., the I(u, ad)) is the sum of the degrees of influence of the user's friends, that is, I(u, ad)=$\Sigma v \in F(u)$ inf(u, v)*I(v, ad).

S103: Determining, according to the delivery-recommendation-degree, one or more target promotion-information-items from the set of promotion-information-items-to-be-delivered.

For example, step S103 may specifically include: arranging, according to the delivery-recommendation-degree, the promotion-information-items-to-be-delivered in the set of promotion-information-items-to-be-delivered in a sequence, and generating a corresponding resource list; and selecting promotion-information-items-to-be-delivered corresponding to first preset number of items in the resource list as the target promotion-information-items.

In one embodiment, the promotion-information-items-to-be-delivered may be arranged in sequence in a descending order of the delivery-recommendation-degree. The preset number of items can be determined according to actual requirements, for example, the preset number of items may be 1, 3, or the like.

Further, the method for determining the target promotion-information-items may further include: determining promotion-information-items-to-be-delivered with the delivery-recommendation-degree being greater than a preset recommendation degree from the set of promotion-information-items-to-be-delivered; and determining the promotion-information-item-to-be-delivered with the delivery-recommendation-degree being greater than the preset recommendation degree as the target promotion-information-items.

In one embodiment, the preset recommendation degree may be determined according to actual requirements. For example, the preset recommendation degree may be set to be 8 scores, and when it is obtained through calculation that there is promotion-information-item-to-be-delivered with the delivery-recommendation-degree being greater than 8 scores in the set of promotion-information-item-to-be-delivered, the promotion-information-item-to-be-delivered is included as the target promotion-information-item.

S104: Delivering the target promotion-information-items to a user equipment corresponding to the user.

In one embodiment, the delivery server may send the target promotion-information-items to the user equipment, for example, a smartphone, and display the target promotion-information-items to the user by an application (for example, the microblog or Facebook in social applications) in the user equipment, so as to implement an operation of delivering the target promotion-information-items.

Accordingly, in the method for delivering promotion-information-items of one embodiment, by obtaining a set of promotion-information-items-to-be-delivered to a user, obtaining a delivery-recommendation-degree corresponding to the user according to promotion-information-items-to-be-delivered in the set of promotion-information-items-to-be-delivered, then determining, according to the delivery-recommendation-degree, target promotion-information-items from the set of promotion-information-items-to-be-delivered, and delivering the target promotion-information-items to the user, various factors, such as a clicking intention of a user and friend interaction influence, can be comprehensively taken into consideration to select an advertisement and deliver same to the user, with high delivery accuracy and a good delivery effect.

In one embodiment, another example is used for description in which the apparatus for delivering promotion-information-item is integrated in a delivery server, and the promotion-information-item is an advertisement.

Figure 2A:
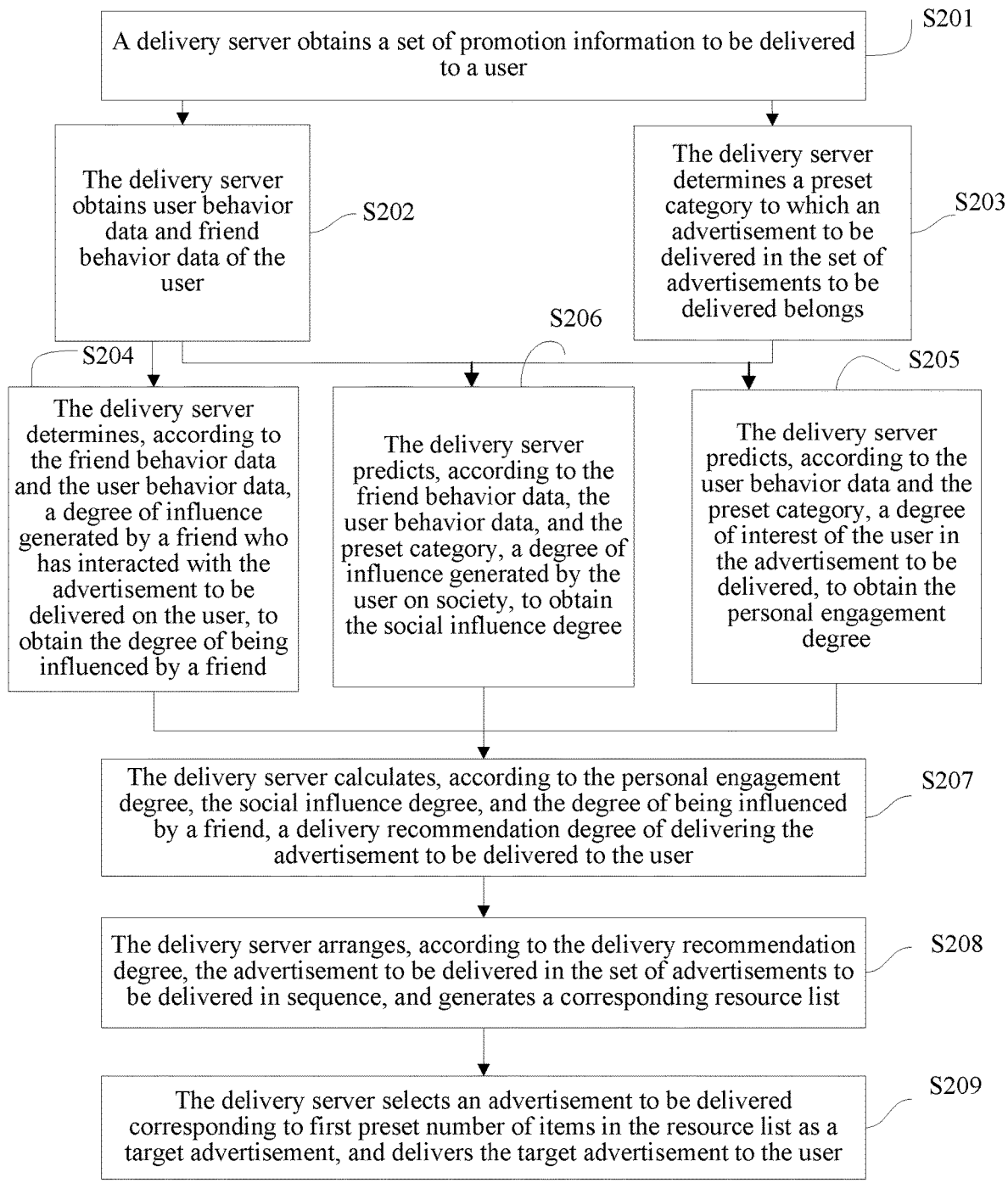
FIG. 2A is a schematic flowchart of another method for delivering promotion information according to an embodiment of the present disclosure.

As shown in FIG. 2, FIG. 2 shows a method for delivering promotion-information-items, and a specific procedure of the method for delivering promotion-information-item may be as follows.

S201: A delivery server obtains a set of promotion-information-items-to-be-delivered to a user.

For example, when the delivery server receives an advertisement delivering request sent by a user equipment, the delivery server may obtain all advertisements which have not been delivered to the user from a database of the delivery server.

S202: The delivery server obtains user behavior data and friend behavior data of the user.

For example, the delivery server may obtain behavior data of the user and all friends of the user within the recent half a year or other period of time. The behavior data includes behavior data that the user or the user's friends view, comment, give a thumb-up for, forward, or reply delivered advertisements, and behavior data of chatting and interacting with others by the user or the user's friends.

S203: The delivery server determines a preset category to which an advertisement-to-be-delivered in the set of advertisements-to-be-delivered belongs.

For example, the preset category may be a preset theme type, which may include skin care, automobiles, mothers and babies, men's clothing, women's clothing, or the like. The delivery server may match a keyword by using literal information in the advertisement-to-be-delivered, and obtain a corresponding preset category according to the matched keyword. For example, when the advertisement-to-be-delivered mentions automobiles or automobile parts (for example, automobile tires) multiple times, the keyword matched by the delivery server is automobile or tire, and the obtained preset category is automobiles.

S204: The delivery server determines, according to the friend behavior data and the user behavior data, a degree of influence generated by friends who have interacted with the advertisement-to-be-delivered on the user, to obtain the degree of being influenced by friends.

For example, step S204 may specifically include: determining, according to the friend behavior data, a first friend who has interacted with the advertisement-to-be-delivered, and obtaining friend behavior sub-data of the first friend from the friend behavior data; and counting, according to the user behavior data and the friend behavior sub-data, an intimacy degree between the user and the first friend, and determining the intimacy degree as the degree of being influenced by friends of the user.

For example, a user's friend who has performed behaviors such as commenting, giving a thumb-up, or forwarding on the advertisement-to-be-delivered is determined as the first friend according to the friend behavior data, and the intimacy degree between the first friend and the user is calculated according to data such as a historical chatting frequency, a degree of common interest, and an interaction rate of the two parties between the first friend and the user.

S205: The delivery server predicts, according to the user behavior data and the preset category, a degree of interest of the user in the advertisement-to-be-delivered, to obtain the personal engagement degree.

For example, when the advertisement-to-be-delivered belongs to the automobiles, the delivery server may count viewing or interaction data of the user for delivered automobiles advertisements within the recent half a year, and calculates and predicts the degree of interest of the user in the advertisement-to-be-delivered by the LR algorithm.

S206: The delivery server predicts, according to the friend behavior data, the user behavior data, and the preset category, a degree of influence generated by the user on society, to obtain the social influence degree.

For example, step S206 may specifically include: obtaining behavior data of other friends of the user's friends; obtaining interaction data of interaction between the user and all delivered advertisements of the preset category from the user behavior data, and counting a corresponding interaction rate; counting, according to the interaction data and the friend behavior data, a first clicking rate at which the user's friend clicks on the delivered advertisement after the user interacts with the delivered advertisement; counting, according to the friend behavior data and the behavior data of other friends, a second clicking rate at which the friend of the user's friend clicks on the delivered advertisement after the user's friend interacts with the delivered advertisement; and performing calculation, according to the interaction rate, the first clicking rate, and the second clicking rate based on a preset algorithm, so as to predict the social influence degree at which the user influences the society for the advertisement-to-be-delivered.

For example, the delivery server may obtain data of interaction behaviors such as commenting, giving a thumb-up, or forwarding performed by the user on automobiles advertisements delivered in the recent half a year as interaction data, and calculate the corresponding interaction rate pactive(u, ad). Meanwhile, the delivery server may also calculate the first clicking rate inf(u, v) at which a user's friend clicks on an automobiles advertisement after the user interacts with the delivered automobiles advertisement, and the second clicking rate I(v, ad) at which a friend of the user's friend clicks on the same automobiles advertisement after the user's friend clicks on the delivered automobiles advertisement, and calculate the social influence degree I(u, ad) of the user by obtaining the sum of products of the interaction rate pactive(u, ad) of the user and the first clicking rate inf(u, v) and second clicking rate I(v, ad) of each user's friend, that is, I(u, ad)=Σv∈F(u) inf(u, v)*I(v, ad).

S207: The delivery server calculates, according to the personal engagement degree, the social influence degree, and the degree of being influenced by friends, a delivery-recommendation-degree of delivering the advertisement-to-be-delivered to the user.

For example, the delivery server may calculate the delivery-recommendation-degree according to the following formula:

$$\begin{aligned} \text{quality}(u, ad) &= pctr(u, ad) + \text{diffusion}(u, ad) \\ &= pctr(u, ad) + \sum v \in F(u) pactive(u, ad) * \\ &\quad inf(u, v) * I(v, ad) \\ &= pctr(u, ad) + pactive(u, ad) * I(u, ad). \end{aligned}$$

where u represents the user, v represents the user's friend, and ad represents the advertisement-to-be-delivered; quality (u, ad) is the comprehensive score of the user for the promotion-information-item-to-be-delivered, that is, the delivery-recommendation-degree; pctr(u, ad) is the rate at which the user clicks on the promotion-information-item-to-be-delivered, covers voluntary clicking intension of the user and clicking intension influenced by others, and may specifically obtained by adding the degree of being influenced by a friend and the personal engagement degree of the user obtained through calculation in step S204 and step S205; and diffusion(u, ad) is the social influence degree of the user for the promotion-information-item-to-be-delivered, and diffusion(u, ad)=pactive(u, ad)*I(u, ad), where calculation of I(u, ad) and pactive(u, ad) may be referred to step S206.

Figure 2B:
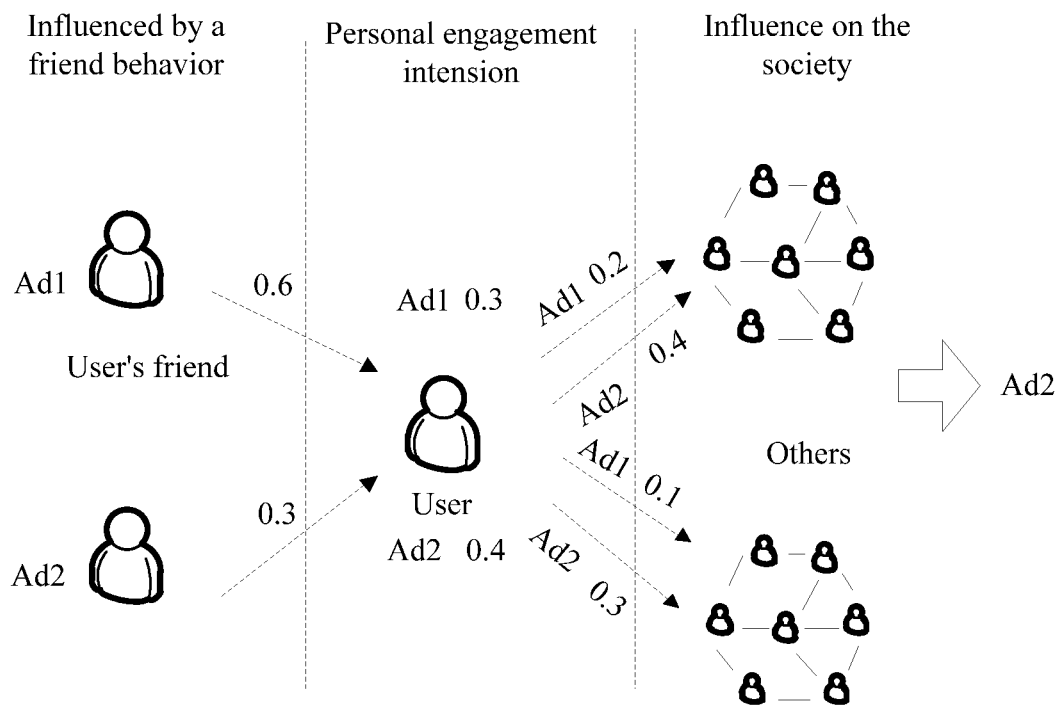
FIG. 2B is a schematic diagram of a personal engagement degree, a social influence degree, and a degree of being influenced by a friend according to an embodiment of the present disclosure.

For example, as shown in FIG. 2B, for a skin care advertisement-to-be-delivered Ad1, if the degree of being influenced by a friend of the user is 0.6 and the personal engagement degree of the user is 0.3, pctr(u, ad)=0.6+0.3=0.9. If the social influence degree of the user for some friends is 0.2 and the social influence degree of the user for the other friends is 0.1, diffusion(u, ad)=0.2+0.1=0.3. Finally, the delivery-recommendation-degree of the advertisement-to-be-delivered Ad1, quality(u, ad1)=0.9+0.3=1.2.

For an automobile advertisement-to-be-delivered Ad2, if the degree of being influenced by a friend of the user is 0.3 and the personal engagement degree of the user is 0.4, pctr(u, ad)=0.3+0.4=0.7. If the social influence degree of the user for some friends is 0.4 and the social influence degree of the user for the other friends is 0.7, diffusion(u, ad)=0.4+0.3=0.7. Finally, the delivery-recommendation-degree of the advertisement-to-be-delivered Ad2, quality(u, ad2)=0.7+0.7=1.4.

S208: The delivery server arranges, according to the delivery-recommendation-degree, the advertisements-to-be-delivered in the set of advertisements-to-be-delivered in sequence, and generates a corresponding resource list.

For example, the delivery server may arrange the advertisements-to-be-delivered in sequence according to a descending order of the corresponding delivery-recommendation-degrees, and generate a corresponding resource list according to the sorted advertisements-to-be-delivered.

S209: The delivery server selects the advertisements-to-be-delivered corresponding to first preset number of items in the resource list as the target advertisements, and delivers the target advertisements to a user equipment corresponding to the user.

For example, the delivery server may use the first advertisement-to-be-delivered in the resource list as the target advertisement. For example, for the set of advertisementsto-be-delivered Ad1 and Ad2, quality(u, ad1)=1.2<quality (u, ad2)=1.4, so Ad2 is the first advertisement-to-be-delivered in the resource list. Therefore, the target advertisement determined by the delivery server is Ad2. Then, the delivery server may deliver Ad2 to a social application such as the microblog in the user equipment.

Accordingly, in the method for delivering promotion-information-item provided in one embodiment, the delivery server obtains a set of advertisements-to-be-delivered to a user and user behavior data and friend behavior data of the user, and determines a preset category of an advertisement-to-be-delivered in the set of advertisements-to-be-delivered. Further, the delivery server determines, according to the friend behavior data and the user behavior data, a degree of influence generated by a friend who has interacted with the advertisement-to-be-delivered on the user, to obtain a degree of being influenced by a friend, predicts, according to the user behavior data and the preset category, a degree of interest of the user on the advertisement-to-be-delivered, to obtains a personal engagement degree, and predicts, according to the friend behavior data, the user behavior data, and the preset category, a degree of influence generated by the user on society, to obtain a social influence degree; and subsequently, the delivery server calculates, according to the personal engagement degree, the social influence degree, and the degree of being influenced by a friend, a delivery-recommendation-degree of delivering the promotion-information-item-to-be-delivered to the user, determines an advertisement-to-be-delivered with the delivery-recommendation-degree being greater than a preset recommendation degree from the set of advertisements-to-be-delivered, finally determines the advertisement-to-be-delivered with the delivery-recommendation-degree being greater than the preset recommendation degree as a target advertisement, and delivers the target advertisement to the user. Various factors, such as a clicking intention of the user and friend interaction influence, can be comprehensively taken into consideration to select an advertisement and deliver same to the user, making it convenient for the user to view the advertisement and interact with the advertisement, with high delivery accuracy and a good delivery effect.

Figure 3:
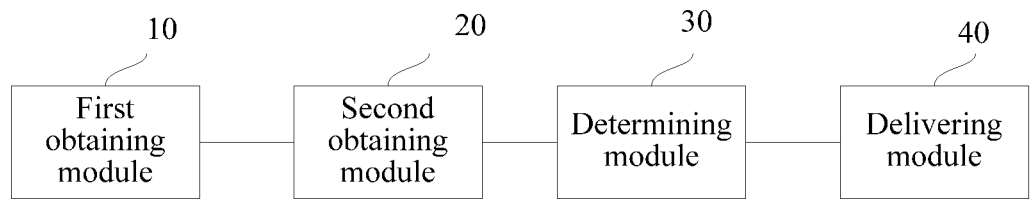
FIG. 3 is a schematic structural diagram of an apparatus for delivering promotion information according to an embodiment of the present disclosure.

Another embodiment provides descriptions from the perspective of an apparatus for delivering promotion-information-item. Referring to FIG. 3, FIG. 3 describes an apparatus for delivering promotion-information-item provided in the present disclosure. The apparatus may include: a first obtaining module 10, a second obtaining module 20, a determining module 30, and a delivering module 40.

The first obtaining module 10 is configured to obtain a set of promotion-information-items-to-be-delivered to a user.

In one embodiment, the set of promotion-information-items-to-be-delivered is usually stored in a delivery server and may include all promotion-information-items which is not delivered to the user by the delivery server. The promotion-information-item may be an advertisement, or may also be other information to be promoted and delivered, and the like. The promotion-information-item is mainly delivered in some social applications, for example, micro blogs or clients of some online dating sites. When the delivery server receives a delivering request sent by a user equipment, the first obtaining module 10 obtains a set of promotion-information-items-to-be-delivered to the user, and generally the set of promotion-information-items-to-be-delivered is a sum of all the promotion-information-items which have not delivered to the user.

The second obtaining module 20 is configured to obtain a delivery-recommendation-degree corresponding to the user according to promotion-information-items-to-be-delivered in the set of promotion-information-items-to-be-delivered.

In one embodiment, the delivery-recommendation-degree may refer to a degree of recommendation to deliver the promotion-information-item-to-be-delivered to the user, which may be presented in a score or a ratio.

For example, the second obtaining module 20 may specifically include: an obtaining submodule, a first determining submodule, a second determining submodule, and a calculating submodule.

The obtaining submodule is configured to obtain user behavior data and friend behavior data of the user.

In one embodiment, the friend behavior data may refer to behavior data of all friends of the user. The user behavior data and the friend behavior data may be historical behavior data of the user or the user's friends, which may be stored in the user server and may specifically include behaviors of viewing, commenting, giving a thumb-up, forwarding, replying, or the like for the delivered promotion-information-item by the user or the user's friends, and behaviors of chatting and interacting with others by the user or the user's friends.

In a practical application process, when the user or the user's friend performs behaviors such as viewing, commenting, giving a thumb-up, forwarding, or replying on the delivered promotion-information-item by the user equipment, such as a smartphone, the user equipment may send the behavior data to the user server for storing.

The first determining submodule is configured to determine a preset category to which the promotion-information-item-to-be-delivered in the set of promotion-information-items-to-be-delivered belongs.

In one embodiment, the preset category may be determined according to actual requirements. The preset category may be an application field or a relevant theme of a product in the promotion-information-item or a promotion purpose of the promotion-information-item, for example, the preset category may be automobiles, mothers and babies, men's clothing, women's clothing, or public welfare. In a practical application, the preset category may be stored in the delivery server in advance, and a series of keywords are set for the preset category, so that the first determining submodule may match a corresponding keyword according to literal content of the promotion-information-item-to-be-delivered and obtain the corresponding preset category.

The second determining submodule is configured to determine, according to the preset category, the user behavior data, and the friend behavior data, a personal engagement degree, a social influence degree, and a degree of being influenced by a friend of the user for the promotion-information-item-to-be-delivered.

In one embodiment, the personal engagement degree, social influence degree, and degree of being influenced by a friend of the user are considered factors for the delivery server to select appropriate promotion-information-item-to-be-delivered to the user. By considering these factors, the delivery server may deliver promotion-information-item to the user relatively accurately, with a high delivery effect.

For example, the second determining submodule may specifically include: a determining unit, a first predicting unit, and a second predicting unit.

The determining unit is configured to determine, according to the friend behavior data and the user behavior data, a degree of influence generated by a friend who has interacted with the promotion-information-item-to-be-delivered on the user, to obtain the degree of being influenced by a friend.

In one embodiment, the degree of being influenced by a friend may refer to a degree of influence of an interaction operation for the promotion-information-item by the user's friend on the user, and the interaction may refer to an operation of commenting, giving a thumb-up for, or forwarding the promotion-information-item, or the like, but does not include an operation of viewing. Generally, influence is generated on the user only after the user's friend interacts with the promotion-information-item. If the user's friend only views or browses the promotion-information-item, no influence is generated on the user.

For example, the determining unit may specifically be configured to: determine, according to the friend behavior data, a first friend who has interacted with the promotion-information-item-to-be-delivered, and obtain friend behavior sub-data of the first friend from the friend behavior data; and count, according to the user behavior data and the friend behavior sub-data, an intimacy degree between the user and the first friend, and determine the intimacy degree as the degree of being influenced by a friend of the user.

In one embodiment, when the promotion-information-item-to-be-delivered is delivered to the first friend, if the first friend interacts with the delivered promotion-information-item, such as commenting, giving a thumb-up, or forwarding, the user may watch the interaction operation in the process of delivering the promotion-information-item-to-be-delivered to the user. Generally, the interaction operation may influence a subsequent clicking operation on the promotion-information-item-to-be-delivered by the user, such as viewing or interacting, and the degree of influence is closely associated with the intimacy degree between the user and the first friend.

Specifically, the intimacy degree may refer to a degree of contact closeness between the user and the first friend, for example, a chatting frequency, a degree of common interest, and an interaction rate between the two parties. The interaction rate between the two parties may include a frequency of performing an operation such as giving a thumb-up, replying, commenting, or forwarding on content published by the counterpart. The determining unit may obtain the degree of contact closeness by analyzing the historical behavior data between the first friend and the user. The historical behavior data may be behavior data of the user or the user's friend within recent one month or half a year. Certainly, the specific period of time may be determined according to actual requirements.

The first predicting unit is configured to predict, according to the user behavior data and the preset category, a degree of interest of the user in the promotion-information-item-to-be-delivered, to obtain the personal engagement degree.

In one embodiment, the degree of interest or the personal engagement degree may refer to a probability of which the user performs a clicking operation on the promotion-information-item-to-be-delivered without being influenced by others. The clicking operation includes viewing and interacting. The first predicting unit may predict the degree of interest of the user in the promotion-information-item-to-be-delivered by combining a characteristic of the user and a characteristic of the promotion-information-item-to-be-delivered. The characteristic of the user may include information such as a gender, an age, an interest, or a historical active field of the user, and can be obtained by analyzing the historical behavior data of the user. The characteristic of the promotion-information-item-to-be-delivered may refer to the preset category to which the promotion-information-item-to-be-delivered belongs, for example, an application field or a relevant theme of a product in the promotion-information-item-to-be-delivered or a promotion purpose.

Specifically, the first predicting unit may determine the characteristic of the user by analyzing the historical behavior data of the user, and predict the degree of interest of the user in the promotion-information-item-to-be-delivered in combination with the promotion-information-item-to-be-delivered by an LR algorithm or a deep learning algorithm, so as to obtain the personal engagement degree of the user.

The second predicting unit is configured to predict, according to the friend behavior data, the user behavior data, and the preset category, a degree of influence generated by the user on society, to obtain the social influence degree.

In one embodiment, the social influence degree may refer to influence, generated after the user interacts with the promotion-information-item, of the interaction operation on a user's friend and on a friend of the user's friend. That is, the social influence degree includes a degree of influence of the user and a degree of influence of the user's friend after the user influences the friend. Generally, the degree of influence of one same user on a friend of the user varies for promotion-information-item of different preset categories, and meanwhile the degree of influence of the user on different friends of the user also varies for the same promotion-information-item.

For example, the second predicting unit may specifically be configured to: obtain behavior data of other friends of the user's friend; obtain interaction data of interaction between the user and all delivered promotion-information-item of the preset category from the user behavior data, and count a corresponding interaction rate; count, according to the interaction data and the friend behavior data, a first clicking rate at which the user's friend clicks on the delivered promotion-information-item after the user interacts with the delivered promotion-information-item; count, according to the friend behavior data and the behavior data of other friends, a second clicking rate at which the friend of the user's friend clicks on the delivered promotion-information-item after the user's friend interacts with the delivered promotion-information-item; and perform calculation, according to the interaction rate, the first clicking rate, and the second clicking rate based on a preset algorithm, so as to predict the social influence degree at which the user influences the society for the promotion-information-item-to-be-delivered.

In one embodiment, the preset algorithm may be set according to actual requirements, and may be, for example, the product of the interaction rate of the user and the first and second clicking rates of all the friends. The behavior data of other friends may refer to behavior data of all friends of the user. The interaction rate may refer to a probability of which the user interacts with promotion-information-item which belongs to the same preset category with the promotion-information-item-to-be-delivered in a past preset period of time (for example, one month or half a year). The clicking operation mainly includes a behavior such as to viewing, commenting, giving a thumb-up, or forwarding.

The calculating submodule is configured to calculate, according to the personal engagement degree, the social influence degree, and the degree of being influenced by a friend, a delivery-recommendation-degree of delivering the promotion-information-item-to-be-delivered to the user.

In one embodiment, the calculating submodule 24 may calculate the delivery-recommendation-degree according to the following formula:

$$\text{quality}(u, ad) = pctr(u, ad) + \text{diffusion}(u, ad)$$
$$= pctr(u, ad) + \sum v \in F(u) pactive(u, ad) *$$
$$inf(u, v) * I(v, ad)$$
$$= pctr(u, ad) + pactive(u, ad) * I(u, ad).$$

where u represents the user, v represents the user's friend, and ad represents the promotion-information-item-to-be-delivered; quality(u, ad) is the comprehensive score of the user for the promotion-information-item-to-be-delivered, that is, the delivery-recommendation-degree; pctr(u, ad) is a clicking rate of the user for the promotion-information-item-to-be-delivered, includes a voluntary clicking behavior of the user and a clicking behavior influenced by others, and may be specifically obtained through calculation based on the degree of being influenced by a friend and the personal engagement degree obtained through calculation by the determining unit and the first predicting unit by a specific algorithm (for example, addition or multiplication).

The diffusion(u, ad) is the social influence degree of the user for the promotion-information-item-to-be-delivered; pactive(u, ad) is the probability of which the user interacts with the promotion-information-item-to-be-delivered, that is, the interaction rate calculated by the second predicting unit; inf(u, v) is the probability of which a user's friend clicks on the promotion-information-item-to-be-delivered after the user interacts with the promotion-information-item-to-be-delivered (that is, the degree of influence of the user), that is, the first clicking rate calculated by the second predicting unit; and I(v, ad) is the probability of which a friend of the user's friend clicks on the promotion-information-item-to-be-delivered after the user's friend interacts with the promotion-information-item-to-be-delivered (that is, the degree of influence of the user's friend), that is, the second clicking rate calculated by the second predicting unit. According to the PageRank algorithm concept, the user performs broadcast and summary on the social influence degree of the promotion-information-item-to-be-delivered (that is, the I(u, ad)) which is the degree of influence of the user's friend, that is, I(u, ad)=$\Sigma v \in F(u)$ inf(u, v)*ad).

Further, the determining module 30 is configured to determine, according to the delivery-recommendation-degree, target promotion-information-item from the set of promotion-information-items-to-be-delivered.

For example, the determining module 30 may specifically be configured to: arrange, according to the delivery-recommendation-degree, the promotion-information-item-to-be-delivered in the set of promotion-information-items-to-be-delivered in a sequence, and generate a corresponding resource list; and select promotion-information-item-to-be-delivered corresponding to first preset number of items in the resource list as the target promotion-information-item.

In one embodiment, the determining module 30 may arrange the promotion-information-item-to-be-delivered in sequence in a descending order of the delivery-recommendation-degree. The preset number of items can be determined according to actual requirements, for example, the preset number of items may be 1, 3, or the like.

The determining module 30 may further be configured to: determine promotion-information-item-to-be-delivered with the delivery-recommendation-degree being greater than a preset recommendation degree from the set of promotion-information-items-to-be-delivered; and determine the promotion-information-item-to-be-delivered with the delivery-recommendation-degree being greater than the preset recommendation degree.

In one embodiment, the preset recommendation degree may be determined according to actual requirements. For example, the preset recommendation degree may be set to be 8 scores, and when it is obtained through calculation that there is promotion-information-item-to-be-delivered with the delivery-recommendation-degree being greater than 8 scores in the set of promotion-information-items-to-be-delivered, the determining module 30 may determine the promotion-information-item-to-be-delivered as the target promotion-information-item.

The delivering module 40 is configured to deliver the target promotion-information-item to a user equipment corresponding to the user.

In one embodiment, the delivering module 40 may send the target promotion-information-item to the user equipment, for example, a smartphone, and display the target promotion-information-item to the user by an application (for example, a microblog or Facebook in social applications) in the user equipment, so as to implement an operation of delivering the target promotion-information-item.

During specific implementation, the foregoing units may be implemented as independent entities, or may be combined arbitrarily, or may be implemented as a same entity or several entities. For specific implementation of the foregoing units, refer to the foregoing method embodiments. Details are not described herein again.

Accordingly, by the apparatus for delivering promotion-information-item of one embodiment, by obtaining, by the first obtaining module 10, a set of promotion-information-items-to-be-delivered to a user, obtaining, by the second obtaining module 20, a delivery-recommendation-degree corresponding to the user according to promotion-information-item-to-be-delivered in the set of promotion-information-items-to-be-delivered, then determining, by the determining module 30 and according to the delivery-recommendation-degree, target promotion-information-item from the set of promotion-information-items-to-be-delivered, and delivering, by the delivering module 40, the target promotion-information-item to the user, various factors, such as a clicking intention of a user and friend interaction influence, can be comprehensively taken into consideration to select an advertisement and deliver same to the user, with high delivery accuracy and a good delivery effect.

Correspondingly, an embodiment of the present disclosure further provides a system for delivering promotion-information-item that includes any apparatus for delivering promotion-information-item provided in the embodiments of the present disclosure. For details of the apparatus for delivering promotion-information-item, refer to Embodiment 3.

The apparatus for delivering promotion-information-item may be specifically integrated in a device of a server such as a delivery server. For example, the delivery server is configured to obtain a set of promotion-information-items-to-be-delivered to a user, obtain a delivery-recommendation-degree corresponding to the user according to promotion-information-items-to-be-delivered in the set of promotion-information-items-to-be-delivered, determine, according to the delivery-recommendation-degree, target promotion-information-item from the set of promotion-information-items-to-be-delivered, and deliver the target promotion-information-item to a user equipment corresponding to the user.

For a specific implementation of each of the foregoing devices, refer to the foregoing embodiments, and details are not described herein again.

Because the system for delivering promotion-information-item may include any apparatus for delivering promotion-information-item provided in the embodiments of the present disclosure, beneficial effects of any apparatus for delivering promotion-information-item provided in the embodiments of the present disclosure can be implemented. For details, refer to the foregoing embodiments, and details are not described herein again.

Figure 4:
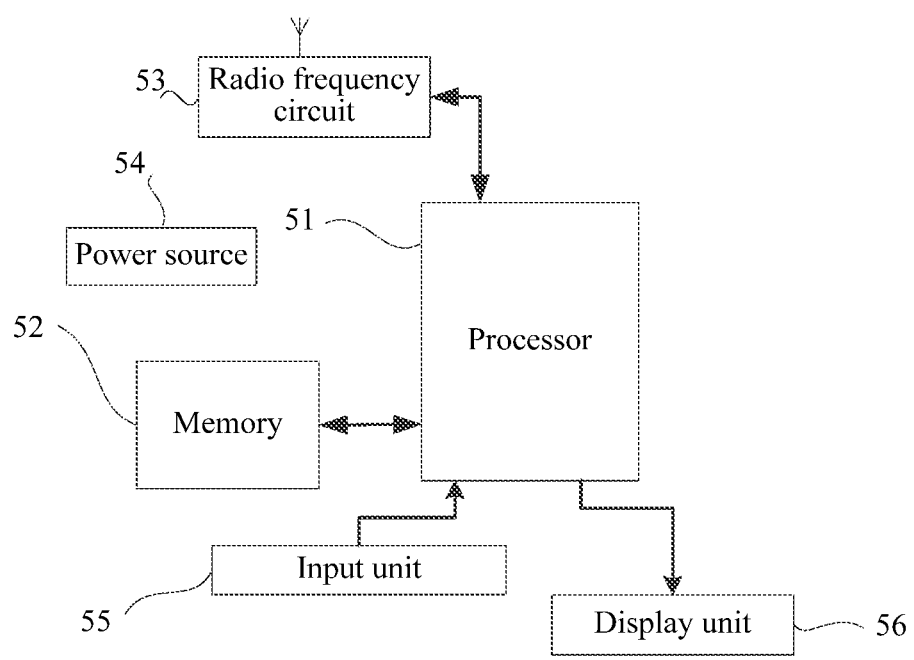
FIG. 4 is a schematic structural diagram of a server according to an embodiment of the present disclosure.

Another embodiment of the present disclosure further provides a server. The server may be integrated into any apparatus for delivering promotion-information-item provided in the embodiments of the present disclosure. As shown in FIG. 4, FIG. 4 is a schematic structural diagram of a server involved in the embodiments of the present disclosure.

The server may include components such as a processor 51 including one or more processing cores, a memory 52 including one or more computer readable storage media, a radio frequency (RF) circuit 53, a power supply 54, an input unit 55, and a display unit 56. A person skilled in the art may understand that the server structure shown in FIG. 4 does not constitute a limit to the server. The server may include more or fewer parts than those shown in the figure, may combine some parts, or may have different part arrangements.

The processor 51 is a control center of the server, and is connected to various parts of the entire server by using various interfaces and lines. By running or executing a software program and/or module stored in the memory 52, and invoking data stored in the memory 52, the processor 401 executes various functions of the server and performs data processing, thereby monitoring the entire server. Optionally, the processor 51 may include one or more processor cores. For example, the processor 51 may integrate an application processor and a modem processor. The application processor mainly processes an operating system, a user interface, an application program, and the like. The modem processor mainly processes wireless communication. It may be understood that the foregoing modem processor may alternatively not be integrated into the processor 51.

The memory 52 may be configured to store a software program and module. The processor 51 runs the software program and module stored in the memory 52, to implement various functional applications and data processing. The memory 52 may mainly include a program storage area and a data storage area. The program storage area may store an operating system, an application program required by at least one function (such as a sound playing function and an image display function), and the like. The data storage area may store data created according to use of the server, and the like. In addition, the memory 52 may include a high speed random access memory, and may further include a non-volatile memory, such as at least one magnetic disk storage device, a flash memory, or other volatile solid-state storage devices. Correspondingly, the memory 52 may further include a memory controller, to provide access of the processor 51 to the memory 52.

The RF circuit 53 may be configured to receive and send a signal during information transmission and receiving. Especially, the RF circuit 51 sends, after receiving downlink information of a base station, the information to one or more processors 51 for processing, and sends involved uplink data to the base station. Generally, the RF circuit 53 includes but is not limited to an antenna, at least one amplifier, a tuner, one or more oscillators, a subscriber identity module (SIM) card, a transceiver, a coupler, a low noise amplifier (LNA), a duplexer, and the like. In addition, the RF circuit 53 may also communicate with a network and another device by wireless communication. The wireless communication may use any communications standard or protocol, which includes but is not limited to, Global System for Mobile Communications (GSM), General Packet Radio Service (GPRS), Code Division Multiple Access (CDMA), Wideband Code Division Multiple Access (WCDMA), Long Term Evolution (LTE), e-mail, Short Message Service (SMS), and the like.

The server further includes the power supply 54 (for example, a battery) that supplies power to each component. For example, the power supply 54 may be logically connected to the processor 51 by using a power supply management system, so that functions such as management of charging, discharging, and power consumption are implemented by using the power supply management system. The power supply 54 may further include one or more of a direct current or alternating current power supply, a re-charging system, a power failure detection circuit, a power supply converter or inverter, a power supply state indicator, and any other components.

The server may further include the input unit 55. The input unit 55 may be configured to receive entered numeric or character information and generate keyboard, mouse, joystick, optical, or trackball signal input related to user settings and function control. Specifically, in a specific embodiment, the input unit 55 may include a touch-sensitive surface and another input device. The touch-sensitive surface, which may also be referred to as a touch screen or a touch panel, may collect a touch operation of a user on or near the touch-sensitive surface (such as an operation of a user on or near the touch-sensitive surface by using any suitable object or accessory such as a finger or a stylus), and drive a corresponding connection apparatus according to a preset program. Optionally, the touch-sensitive surface may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 51. Moreover, the touch controller can receive and execute a command sent by the processor 51. In addition, the touch-sensitive surface may be implemented in multiple types, such as a resistive type, a capacitive type, an infrared type, and a surface acoustic wave type. In addition to the touch-sensitive surface, the input unit 55 may further include another input device. Specifically, another input device may include but is not limited to one or more of a physical keyboard, a function key (for example, a volume control key or a power on/off key), a trackball, a mouse, or a joystick.

The server may further include the display unit 56. The display unit 56 may be configured to display information entered by the user or information provided to the user, and graphical user interfaces of the server. The graphical user interfaces each may include an image, text, an icon, a video, or any combination thereof. The display unit 56 may include a display panel. Optionally, the display panel may be configured in a form of a liquid crystal display (LCD), an organic light-emitting diode (OLED), or the like. Further, the touch-sensitive surface may cover the display panel. After detecting a touch operation on or near the touch-sensitive surface, the touch-sensitive surface transfer the touch operation to the processor 51 to determine a type of a touch event, and then the processor 51 provides corresponding visual output on the display panel according to the type of the touch event. Although in FIG. 4, the touch-sensitive surface and the display panel are used as two separate parts to implement input and output functions, in some embodiments, the touch-sensitive surface and the display panel may be integrated to implement the input and output functions.

Although not shown, the server may further include a camera, a Bluetooth module, and the like. Details are not further provided herein. Specifically, in one embodiment, the processor 51 of the server may load, according to the following instructions, executable files corresponding to processes of one or more application programs into the memory 52. The processor 51 runs the application programs stored in the memory 52, to implement various functions as follows: obtaining a set of promotion-information-items-to-be-delivered to a user; obtaining a delivery-recommendation-degree corresponding to the user according to promotion-information-item-to-be-delivered in the set of promotion-information-items-to-be-delivered; determining, according to the delivery-recommendation-degree, target promotion-information-item from the set of promotion-information-items-to-be-delivered; and delivering the target promotion-information-item to a user equipment corresponding to the user.

For implementation methods of the operations, details may be specifically referred to in the foregoing embodiments, and are not described herein again.

Accordingly, by the server provided in one embodiment, by obtaining a set of promotion-information-items-to-be-delivered to a user, obtaining a delivery-recommendation-degree corresponding to the user according to promotion-information-item-to-be-delivered in the set of promotion-information-items-to-be-delivered, then determining, according to the delivery-recommendation-degree, target promotion-information-item from the set of promotion-information-items-to-be-delivered, and delivering the target promotion-information-item to the user, factors, such as a clicking intention of a user and friend interaction influence, can be comprehensively taken into consideration to select an advertisement and deliver same to the user, with high delivery accuracy.

A person of ordinary skill in the art may understand that all or some of the steps of the methods in the foregoing embodiments may be implemented by a program instructing relevant hardware. The program may be stored in a computer readable storage medium. The storage medium may include: a read-only memory (ROM), a random-access memory (RAM), a magnetic disk, an optical disc, or the like.

The method, the apparatus, and the system for delivering promotion-information-item provided in the embodiments of the present disclosure are described above in detail. Although the principles and implementations of the present disclosure are described by using specific embodiments in the specification, the foregoing descriptions of the embodiments are only intended to help understand the method and core idea of the method of the present disclosure. Meanwhile, a person of ordinary skill in the art may make modifications to the specific implementations and application range according to the idea of the present disclosure. In conclusion, the content of the specification should not be construed as a limitation to the present disclosure.

What is claimed is:

1. A method for delivering promotion information performed by a system, the system comprising a delivery server, a user server, a user terminal of a user, a first friend terminal of a first friend of the user, a second friend terminal of a second friend of the user, and a non-user terminal of a non-user friend of the second friend, the method comprising:

obtaining, by the delivery server, promotion-information-items-to-be-delivered to be delivered to the user terminal of the user and promotion-information-items-past-delivered that have previously been delivered to the user terminal of the user;

storing, by the delivery server, the promotion-information-items-to-be-delivered as obtained;

prior to pushing the promotion-information-items-to-be-delivered to the user terminal of the user, pushing, by the delivery server, at least some of the promotion-information-items-to-be-delivered to the first friend terminal of the first friend of the user;

performing, by the first friend terminal of the first friend of the user, forwarding operations on the at least some of the promotion-information-items-to-be-delivered pushed by the delivery server;

monitoring and recording, by the first friend terminal of the first friend of the user, the forwarding operations as performed;

sending, by the first friend terminal of the first friend of the user, the forwarding operations to the user server;

storing, by the user server, the forwarding operations sent by the first friend terminal of the first friend of the user;

sending, by the user server to the delivery server, the forwarding operations as stored in the user server;

determining, by the delivery server, a degree of being-influenced-by-the-first-friend of the user by counting the forwarding operations by the first friend of the user, the higher the count, the greater in value is the determined degree of being-influenced-by-the-first-friend of the user;

transmitting, from the user terminal to the second friend terminal of the second friend of the user, the promotion-information-items-past-delivered;

receiving, by the second friend terminal of the second friend of the user, the promotion-information-items-past-delivered transmitted by the user terminal;

performing, by the second friend terminal of the second friend of the user, first click operations on the promotion-information-items-past-delivered transmitted by the user terminal;

monitoring and recording, by the second friend terminal of the second friend of the user, the first click operations as performed;

transmitting, by the second friend terminal of the second friend of the user, the first click operations as recorded to the user server;

transmitting, from the second friend terminal to the non-user terminal of the non-user friend of the second friend, the promotion-information-items-past-delivered;

receiving, by the non-user friend terminal of the non-user friend of the second friend of the user, the promotion-information-items-past-delivered transmitted by the second friend terminal of the second friend of the user;

performing, by the non-user friend terminal of the non-user friend of the second friend of the user, second click operations on the promotion-information-items-past-delivered transmitted by the second friend terminal of the second friend of the user;

monitoring and recording, by the non-user friend terminal of the non-user friend of the second friend of the user, the second click operations as performed;

transmitting, by the non-user friend terminal of the non-user friend of the second friend of the user, the second click operations as recorded to the user server;

storing, by the user server, the first click operations transmitted from the second friend terminal and the second click operations transmitted from the non-user friend terminal;

sending, by the user server, the first and the second click operations to the delivery server;

prior to pushing the promotion-information-items-to-be-delivered to the user terminal of the user and after pushing the promotion-information-items-past-delivered to the user terminal of the user, obtaining, by the delivery server, a social influence degree of the user on the second friend terminal of the second friend of the user, via:

receiving, by the delivery server, the first click operations and the second click operations from the user server;

determining, by the delivery server and according to the first click operations, a first clicking rate at which the second friend of the user clicks on the promotion-information-items-past-delivered from the user terminal of the user to the second friend terminal of the second friend of the user, and determining, by the delivery server and according to the second click operations, a second clicking rate at which the non-user friend of the second friend of the user clicks on the promotion-information-items-past-delivered from the second terminal of the second friend of the user to the non-user friend terminal of the non-user friend of the user; and determining, by the delivery server, the social influence degree by calculating a sum using the first clicking rate and the second clicking rate;

prior to pushing the promotion-information-items-to-be-delivered to the user terminal of the user, determining, by the delivery server, a delivery-recommendation-degree corresponding to the promotion-information-items-to-be-delivered, the delivery-recommendation-degree being a sum of the degree of being-influenced-by-the-first-friend and the social influence degree; and delivering, by the delivery server, the promotion-information-items-to-be-delivered to the user terminal of the user, the promotion-information-items-to-be-delivered being one of a preset number of promotion-information-items having the highest delivery-recommendation-degrees.

2. The method according to claim 1, wherein obtaining the degree of being-influenced-by-the-first-friend comprises:

determining, by the delivery server, the first friend has interacted with the at least some of the promotion-information-items-to-be-delivered; and determining, by the delivery server, an intimacy degree between the user and the first friend to be included in the degree of being-influenced-by-the-first-friend of the user.

3. The method according to claim 1, wherein the one or more target promotion-information-items include a first target promotion item and a second target promotion item, wherein the first target promotion item corresponds to a first sum of the degree of being-influenced-by-the-first-friend and the social influence degree, and wherein the second target promotion item corresponds to a second sum of the degree of being-influenced-by-the-first-friend and the social influence degree, the method further comprising:

presenting, by the delivery server, the first sum in a first decimal;

presenting, by the delivery server, the second sum in a second decimal;

determining, by the delivery server, the second decimal is greater in value than the first decimal; and pushing, by the delivery server, to the user the second target promotion item ahead of the first target promotion item.

4. The method according to claim 1, further comprising:

obtaining, by the delivery server, a personal engagement degree of the user; and adding, by the delivery server, the personal engagement degree to the sum to obtain the delivery-recommendation-degree, wherein the personal engagement degree is a probability of which the user performs a clicking operation on the promotion-information-items-past-delivered.

5. The method according to claim 1, further comprising:

storing, by the delivery sever, a preset category to which the promotion-information-item-to-be-delivered belongs; and determining, by the delivery server, the degree of being-influenced-by-the-first-friend or the social influence degree further according to the preset category.

6. The method according to claim 1, further comprising:

monitoring, by the delivery server, that pushing of the at least some of the promotion-information-items-to-be-delivered to the first friend terminal of the first friend of the user be performed prior to pushing the promotion-information-items-to-be-delivered to the user terminal of the user.

7. A system for delivering promotion information, the system comprising:

a delivery server configured to:

obtain promotion-information-items-to-be-delivered to be delivered to a user terminal of the user and promotion-information-items-past-delivered that have previously been delivered to the user terminal of the user;

store the promotion-information-items-to-be-delivered as obtained; and prior to pushing the promotion-information-items-to-be-delivered to a user terminal of a user, push at least some of the promotion-information-items-to-be-delivered to a first friend terminal of a first friend of the user;

the first friend terminal of the first friend of the user configured to:

perform the forwarding operations on the at least some of the promotion-information-items-to-be-delivered pushed by the delivery server;

monitor and record the forwarding operations as performed; and send the forwarding operations to a user server;

the user server configured to:

store the forwarding operations sent by the first friend terminal of the first friend of the user; and send to the delivery server the forwarding operations as stored;

the user terminal configured to transmit, to the second friend terminal of the second friend of the user, the promotion-information-items-past-delivered;

a second friend terminal of a second friend of the user configured to:

receive the promotion-information-items-past-delivered transmitted by the user terminal;

perform first click operations on the promotion-information-items-past-delivered transmitted by the user terminal;

monitor and record the first click operations as performed;

transmit the first click operations as recorded to the user server; and transmit, to the non-user terminal of the non-user friend of the second friend, the promotion-information-items-past-delivered;

a non-user friend terminal of a non-user friend of the second friend of the user configured to:

receive the promotion-information-items-past-delivered transmitted by the second friend terminal of the second friend of the user;

perform second click operations on the promotion-information-items-past-delivered transmitted by the second friend terminal of the second friend of the user;

monitor and record the second click operations as performed; and transmit the second click operations as recorded to the user server;

wherein the user server is further configured to:

store the first click operations transmitted from the second friend terminal and the second click operations transmitted from the non-user friend terminal; and send the first and the second click operations to the delivery server;

wherein the delivery server is further configured to:

determine a degree of being-influenced-by-the-first-friend of the user by counting the forwarding operations by the first friend of the user, the higher the count, the greater in value is the determined degree of being-influenced-by-the-first-friend of the user;

prior to pushing the promotion-information-items-to-be-delivered to the user terminal of the user and after pushing the promotion-information-items-past-delivered to the user terminal of the user, obtain a social influence degree of the user on a second friend terminal of the second friend of the user, via:

receiving, by the delivery server, the first click operations and the second click operations from the user server;

determining, by the delivery server and according to the first click operations, a first clicking rate at which the second friend of the user clicks on the promotion-information-items-past-delivered from the user terminal of the user to the second friend terminal of the second friend of the user, and determining, by the delivery server and according to the second click operations, a second clicking rate at which the non-user friend of the second friend of the user clicks on the promotion-information-items-past-delivered from the second terminal of the second friend of the user to the non-user friend terminal of the non-user friend of the user; and determining, by the delivery server, the social influence degree by calculating a sum using the first clicking rate and the second clicking rate;

wherein the delivery server is further configured to:

prior to pushing the promotion-information-items-to-be-delivered to the user terminal of the user, determine a delivery-recommendation-degree corresponding to each of the promotion-information-items-to-be-delivered, the delivery-recommendation-degree being a sum of the degree of being-influenced-by-the-first-friend and the social influence degree; and deliver the promotion-information-items-to-be-delivered to the user terminal of the user, the promotion-information-items-to-be-delivered being one of a preset number of promotion-information-items having the highest delivery-recommendation-degrees.

8. The system according to claim 7, wherein the delivery server is further configured to:

determine the first friend has interacted with the at least some of the promotion-information-items-to-be-delivered; and determine an intimacy degree between the user and the first friend to be included in the degree of being-influenced-by-the-first-friend of the user.

9. A non-transitory computer-readable storage medium storing computer program instructions executable by at least six processors of a system to perform a method, the system comprising a delivery server, a user server, a user terminal of a user, a first friend terminal of a first friend of the user, a second friend terminal of a second friend of the user, and a non-user terminal of a non-user friend of the second friend, and the method comprising:

obtaining, by the delivery server, for a user promotion-information-items-to-be-delivered to be delivered to the user terminal of the user and promotion-information-items-past-delivered that have previously been delivered to the user terminal of the user;

storing, by the delivery server, the promotion-information-items-to-be-delivered as obtained;

prior to pushing the promotion-information-items-to-be-delivered to the user terminal of the user, pushing, by the delivery server, at least some of the promotion-information-items-to-be-delivered to the first friend terminal of the first friend of the user;

performing, by the first friend terminal of the first friend of the user, forwarding operations on the at least some of the promotion-information-items-to-be-delivered pushed by the delivery server;

monitoring and recording, by the first friend terminal of the first friend of the user, the forwarding operations as performed;

sending, by the first friend terminal of the first friend of the user, the forwarding operations to the user server;

storing, by the user server, the forwarding operations sent by the first friend terminal of the first friend of the user;

sending, by the user server to the delivery server, the forwarding operations as stored;

determining, by the delivery server, a degree of being-influenced-by-the-first-friend of the user by counting the forwarding operations by the first friend of the user, the higher the count, the greater in value is the determined degree of being-influenced-by-the-first-friend of the user;

transmitting, from the user terminal to the second friend terminal of the second friend of the user, the promotion-information-items-past-delivered;

receiving, by the second friend terminal of the second friend of the user, the promotion-information-items-past-delivered transmitted by the user terminal;

performing, by the second friend terminal of the second friend of the user, first click operations on the promotion-information-items-past-delivered transmitted by the user terminal;

monitoring and recording, by the second friend terminal of the second friend of the user, the first click operations as performed;

transmitting, by the second friend terminal of the second friend of the user, the first click operations as recorded to the user server;

transmitting, from the second friend terminal to the non-user terminal of the non-user friend of the second friend, the promotion-information-items-past-delivered;

receiving, by the non-user friend terminal of the non-user friend of the second friend of the user, the promotion-information-items-past-delivered transmitted by the second friend terminal of the second friend of the user;

performing, by the non-user friend terminal of the non-user friend of the second friend of the user, second click operations on the promotion-information-items-past-delivered transmitted by the second friend terminal of the second friend of the user;

monitoring and recording, by the non-user friend terminal of the non-user friend of the second friend of the user, the second click operations as performed;

transmitting, by the non-user friend terminal of the non-user friend of the second friend of the user, the second click operations as recorded to the user server;

storing, by the user server, the first click operations transmitted from the second friend terminal and the second click operations transmitted from the non-user friend terminal;

sending, by the user server, the first and the second click operations to the delivery server;

prior to pushing the promotion-information-items-to-be-delivered to the user terminal of the user and after pushing the promotion-information-items-past-delivered to the user terminal of the user, obtaining, by the delivery server, a social influence degree of the user on a second friend terminal of the second friend of the user, via:

receiving, by the delivery server, the first click operations and the second click operations from the user server;

determining, by the delivery server and according to the first click operations, a first clicking rate at which the second friend of the user clicks on the promotion-information-items-past-delivered from the user terminal of the user to the second friend terminal of the second friend of the user, and determining, by the delivery server and according to the second click operations, a second clicking rate at which the non-user friend of the second friend of the user clicks on the promotion-information-items-past-delivered from the second terminal of the second friend of the user to the non-user friend terminal of the non-user friend of the user; and determining, by the delivery server, the social influence degree by calculating a sum using the first clicking rate and the second clicking rate;

prior to pushing the promotion-information-items-to-be-delivered to the user terminal of the user, determining, by the delivery server, a delivery-recommendation-degree corresponding to the promotion-information-items-to-be-delivered, the delivery-recommendation-degree being a sum of the degree of being-influenced-by-the-first-friend and the social influence degree; and delivering, by the delivery server, the promotion-information-items-to-be-delivered to the user terminal of the user, the promotion-information-items-to-be-delivered being one of a preset number of promotion-information-items having the highest delivery-recommendation-degrees.

10. The non-transitory computer-readable storage medium according to claim 9, wherein the method further includes:

determining, by the delivery server, the first friend has interacted with the at least some of the promotion-information-items-to-be-delivered; and determining, by the delivery server, an intimacy degree between the user and the first friend to be included in the degree of being-influenced-by-the-first-friend of the user.

* * * * *